June 7, 1960 W. J. TROYER 2,939,338
TUNED VISCOUS VIBRATION DAMPER
Filed Oct. 20, 1958 3 Sheets-Sheet 3

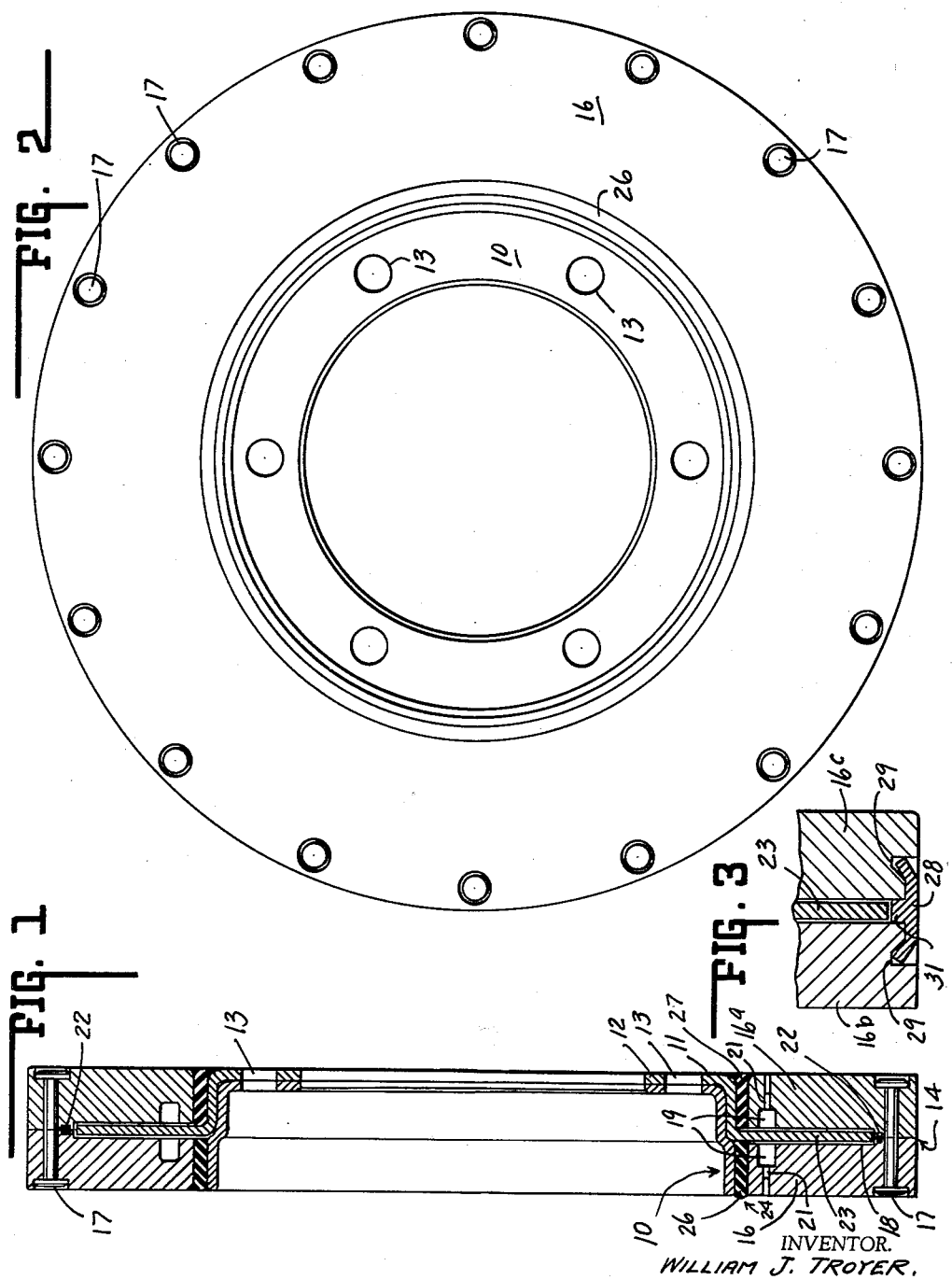

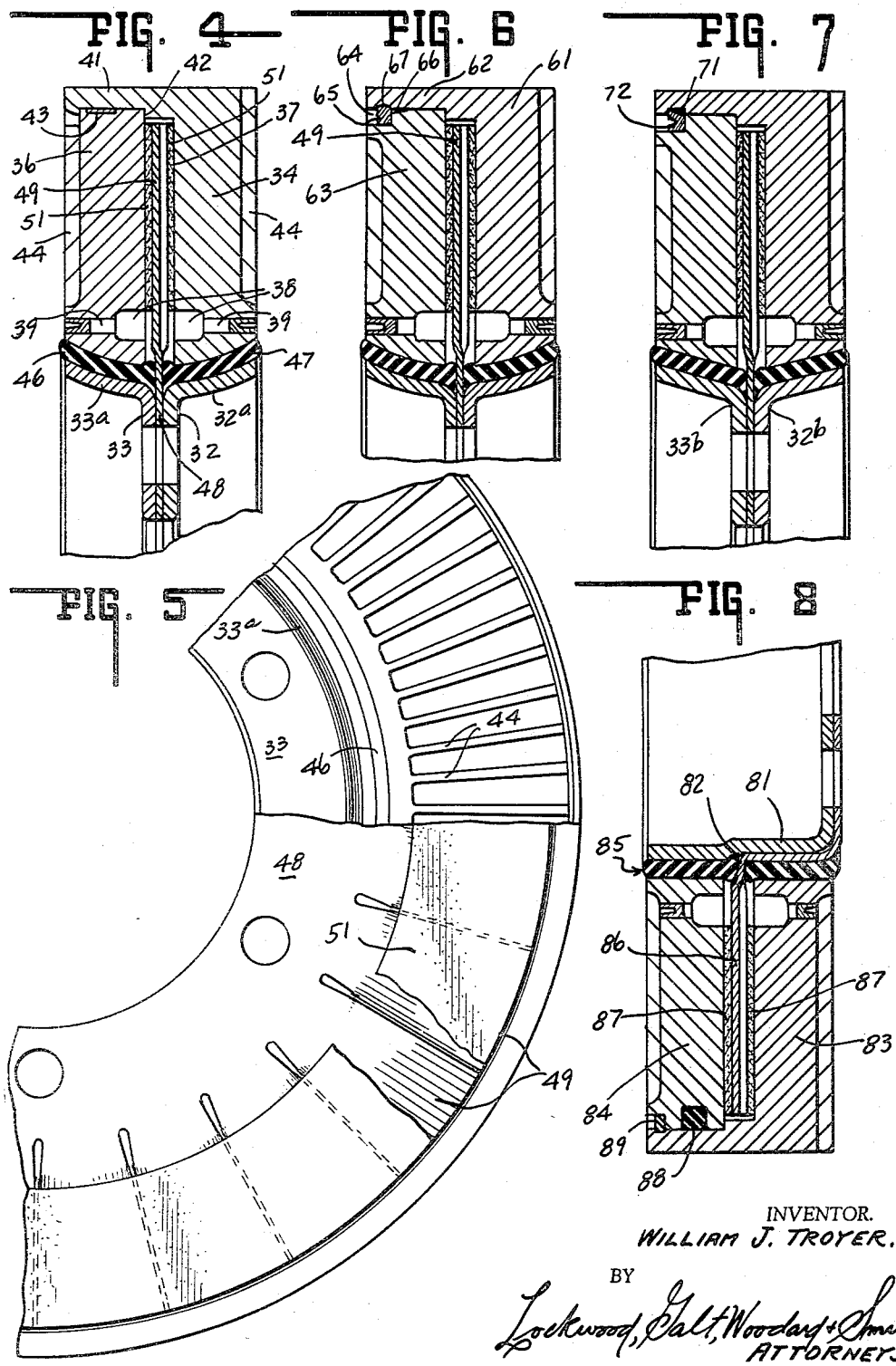

INVENTOR.
WILLIAM J. TROYER.
BY
Lockwood, Galt, Woodard & Smith.
ATTORNEYS.

United States Patent Office 2,939,338
Patented June 7, 1960

2,939,338

TUNED VISCOUS VIBRATION DAMPER

William J. Troyer, Martinsville, Ind., assignor to Schwitzer Corporation, Indianapolis, Ind., a corporation Filed Oct. 20, 1958, Ser. No. 768,320

17 Claims. (Cl. 74—574)

This invention relates generally to vibration dampers and in particular to torsional vibration dampers of the type wherein the resistance to shear of a viscous fluid is utilized to provide at least one component of the vibration damping effect.

In providing torsional vibration dampers for use on, for example, the crankshaft of a reciprocating engine, it is not unknown to utilize the resistance to shear of a viscous fluid for absorbing the torsional vibration of the crankshaft. Prior art devices of this type, however, almost invariably utilize relatively thin-walled housings and are rendered useless if this housing is deformed. Further, these devices are relatively expensive to manufacture since they require close machining tolerances. They are also subject to a marked deterioration of their vibration damping effect with prolonged use due to wear or erosion of certain of the relatively movable parts.

Apparatus embodying the present invention employs elastic elements which tune the inertia mass component of the apparatus to the mass elastic system generating the torsional vibrations, the elastic members absorbing and converting to thermal energy a portion of the kinetic, vibratory energy. The resistance to shear of a film of viscous fluid is also utilized to absorb a further portion of the vibratory energy.

It is an object of the present invention, therefore, to provide a tuned viscous damper of rugged construction that resists damage or destruction by rough handling or prolonged usage.

A further object of the present invention is to provide a tuned viscous damper that has a low parasitic inertia, that is, the inertia effect of that part of the damper rigidly attached to the torsionally vibrating shaft is relatively small.

A further object of the present invention is to provide a tuned viscous damper that can be readily assembled using tooling of the type commonly used in the production of non-viscous vibration dampers.

A further object of the present invention is to provide a high-capacity tuned viscous damper that will readily dissipate the heat generated therein.

A further object of the present invention is to provide a tuned viscous damper in which an elastic element is utilized both to absorb a component of the torsional vibration and to serve the function of sealing the viscous fluid in the cavity provided therefor.

A further object of the present invention is to provide a tuned viscous damper that can be readily cleaned after assembly so that lubricants used in the assembly of the component elements will not contaminate the viscous fluid.

These and other objects will become apparent as the description proceeds with references to the accompanying drawings in which:

Fig. 1 is a side sectional view of a damper assembly embodying the present invention.

Fig. 2 is an end view of the damper shown in Fig. 1.

Fig. 3 is a fragmentary sectional side view illustrating an alternate construction of one of the damper assembly components.

Fig. 4 is a view similar to Fig. 1, but illustrating a modified form of the invention.

Fig. 5 is a fragmentary, end view, with parts broken away, of the form of the invention shown in Fig. 4.

Fig. 6 is a fragmentary view illustrating an alternate construction of one of the damper assembly components.

Fig. 7 is a view similar to Fig. 4, but illustrating a further modified form of the invention.

Fig. 8 is a view similar to Fig. 4, but illustrating a still further modified form of the invention.

Figure 9:
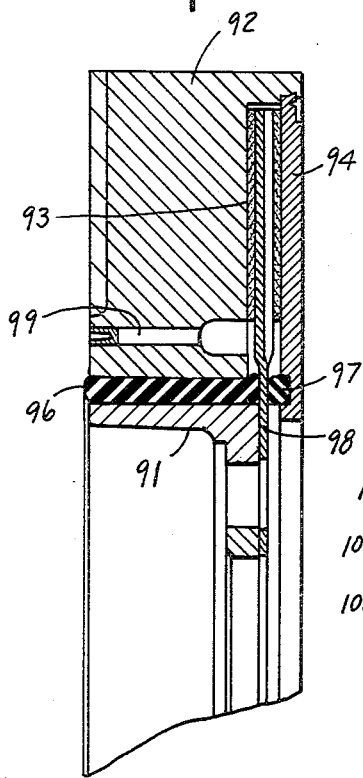
Fig. 9 is a view similar to Fig. 4, but illustrating a still further modified form of the present invention.

Referring initially to Figures 1 and 2, the assembly embodying the present invention comprises a driving member 10 and having a generally hollow cylindrical configuration. The driving member has rigidly secured thereto by any suitable means a flanged annular member 11, the radially inwardly extending portion of the driving member and the adjacent portion of the member 11 providing radial flange 12 which is adapted to be mounted on a hub, accessory drive pulley, or similar means conventionally associated with the crankshaft of a reciprocating engine. The flange 12 may be provided with a plurality of apertures 13 to receive bolts for attaching the driving member to the crankshaft (not shown).

The driven inertia member, indicated generally at 14, is formed of two annular sections 16 and 16a which are joined at their periphery by means of rivets 17. Before assembly, the members 16 and 16a are machined to form a cavity 18 which is adapted to enclose a viscous fluid. At its upper end the cavity is provided with an enlarged portion 19 for accommodating any excess viscous fluid and to provide a space for the fluid to expand when subject to temperature changes. Fill passages 21 may be utilized for introducing fluid into the cavity. An annular sealing gasket 22 seals the peripheral margin of the cavity. The cavity is sized so as to freely accommodate radially extending portion 23 of the driving member, this portion here shown as an extension of the annular member 11.

Interposed between the driven member 14 and the driving member 10 is an elastic element indicated generally at 24. The elastic element includes two annular elastic bands 26 and 27 which are arranged in side-by-side relation. The bands 26 and 27, confined between the driving and driven members, may be formed of rubber or a similar elastic composition and may be injected into the space between the driving and driven members either prior to or after curing. These bands may be in a state of radial compression in the assembly, and a suitable bonding agent may be applied between the elastic element and the driving and driven members depending upon the mode of manufacture used and the operational conditions. In addition to the vibration absorbing function of the elastic element whereby it operates as a tuning spring, this element further serves to seal the inner end of the cavity 18. The material forming the elastic element is selected so that it has physical properties which provide the desired damper tuning and the desired division of work between the elastic element and the viscous damping means.

In operation, with sufficient fluid added to the assembly to provide the required fluid and with the driving member rotating with a shaft subject to torsional vibration, the elastic element will absorb a portion of the torsional vibration. Because of its resistance to shear, the thin film of fluid disposed between the adjacent side faces of the cavity 18 and the radially extending portion 23 will absorb a further component of the vibrations.

Referring to Fig. 3, there is shown further means for sealing and attaching the two sections 16b and 16c of the driven inertia member. The sections are held in assembled relation by means of an annular band 28 whose outer marginal portions are deformed into grooves 29 in the inertia member sections. A circular boss 31 extends between the sections and forms the base of the cavity accommodating the portion 23 of the driving member.

Referring to Figures 4 and 5, there is disclosed a modified form of the invention in which the driving member is composed of outwardly flanged annular members 32 and 33. The outwardly flanged portions 32a and 33a have a curved configuration, in cross-section, for the purpose of resisting axial forces applied to the assembly as disclosed and claimed in my copending patent application Serial No. 662,842, filed May 31, 1957.

The driven inertia member is formed or cast of a ductile material and comprises two sections 34 and 36 which are formed to provide the fluid-retaining cavity 37, the cavity including the enlarged reservoir section 38 and the fill passage 39.

The inertia member section 34 is formed to provide an extending flange 41 and a shoulder 42 in the flange abuts the marginal surface of the inertia member section 36 to position these members so that the desired axial cavity width is obtained. A suitable sealing material is placed in a peripheral groove 43 formed in the inertia member section 36 and the sections are locked together by displacing material on the outer peripheral corner of the section 34 into a groove or undercut formed in the section 36, the sealant in the groove 43 being placed under pressure by this operation. Cooling fins 44 may be formed on the inertia member sections for the purpose of increasing the amount of heat energy that can be dissipated by the damper assembly. In some installations, where the heat energy to be dissipated is relatively low, these fins may be omitted.

Interposed between the driving element and the driven element is an elastic element which comprises two annular elastic bands 46 and 47, these bands having the same function as the bands 26 and 27 described with reference to Figure 1, differing therefrom only slightly in configuration so as to accommodate the opposed curved surfaces of the driving and driven members.

The driving member further includes a disk 48 which extends between and is rigidly secured to the annular members 32 and 33. The disk extends between the inner margins of the elastic bands 46 and 47 and into the cavity 37, with the bands providing a seal for the inner margin of the cavity.

As may best be seen in Figure 5, the peripheral portion of the disk is slotted to provide fingers 49 which are deformed so as to extend in alternately opposite directions out of the plane of the disk. On its face adjacent the appropriate cavity side face each of the fingers is provided with a frictional facing. This frictional facing may be conveniently provided by superimposing an annular member 51 formed of a material having high frictional characteristics, on both sides of the marginal area of the disk with the frictional material being attached to alternate fingers.

In assembling the damper, the fingers are distorted somewhat so that they urge their frictional facing into engagement with the side faces of the cavity. The disk 48 is formed of a somewhat resilient material and the amount of displacement of the fingers 49 out of the plane of the disk in forming the fingers is dependent upon the thickness of the disk, the physical characteristics of the disk material, and force desired to be exerted by the fingers on the side faces of the cavity.

In operation, with the driving member turning with a shaft subject to torsional vibration, one component of the vibration will be absorbed by the elastic element formed by bands 46 and 47, and a component of the vibration will be absorbed by the resistance to shear of the fluid film existing between the frictional facing of the disk fingers and the adjacent side faces of the fluid cavity.

The spring action of the fingers 49 carried by the driving element provides a self-adjusting feature, that is, the assembly compensates for any wear or erosion that may take place and allows the use of liberal machining and assembly tolerances. By alternating the displacement of the fingers out of the major plane of the disc, the thickness of the film of viscous fluid, and consequently the damping characteristics of the assembly, can be altered.

Fig. 6 discloses a modified arrangement for assembling the driven element sections, the driving and driven elements having the same form as those described with reference to Fig. 4. In this arrangement, the driven member section 61 is provided with an axially extending flange 62 which overlays the periphery of the section 63. One corner of the section 63 is machined so that it forms, when assembled with section 62, a circular groove 64 and a circular pocket 66. The under surface of the flange 62 is provided with a groove 67. A suitable sealing compound is placed in the pocket 66 and a ductile wire ring 65 is placed within the groove 64 and rolled or swedged so that it flattens and expands into the groove 67, thereby retaining the inertia members in assembled relation and placing the sealant in the pocket 66 under pressure.

Referring to Fig. 7, there is shown a further modified form of the present invention. This form of the assembly is identical to that described with reference to Figure 4 except that the members 32b and 33b have a frusto-conical configuration rather than a curved configuration. This form of the invention further differs from that of Figure 4 in the formation of the sealing means for the driven element sections. The sections are formed with matching grooves therein as shown in Figure 7, the composite groove having a suitable sealant 71 placed therein and a metallic retaining ring 72 being deformed into locking relation in the groove.

At Fig. 8 a further modified form of the invention is shown. In this arrangement the driving member comprises the element 81, formed similarly to element 10 of Fig. 1, and the disc member 82 rigidly attached thereto. The disc member extends into the cavity formed in the driven member sections 83 and 84 and is provided with resilient fingers 86 carrying frictional facing 87 on their outer surfaces. The elastic element 85, disposed between the driving and driven members, is similar to that described with references to Fig. 1. The mating surfaces between the driven member sections are sealed by a toroidal ring 88 of elastic material, and they are retained in assembly relation by a retaining ring 89 which is deformed into accommodating grooves in the driven member sections.

The modified form of the invention shown at Fig. 9 includes a driving member 91. The driven member includes the section 92 having an annular depression formed in one axial face which cooperates with the driven member section 94 to provide fluid cavity 93. The section 94 is preferably formed of sheet or plate metal but may be cast of a ductile material. The fluid in cavity 93 is prevented from escaping from the cavity at its inner end by the elastic element 96 and by a toroidal ring 97 of elastic material disposed in a groove in the plate or section 94 and contacting the disc 98. An axially extending fill passage 99 is provided in the driven member section 92 to permit filling of the fluid cavity.

Figure 10:
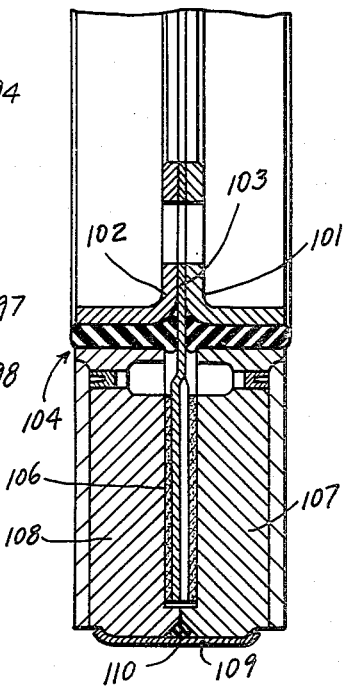
Fig. 10 is a view similar to Fig. 8, but illustrating a still further modified form of the present invention.

The form of the invention shown in Fig. 10 includes a driving member comprising flanged elements 101 and 102 arranged back-to-back with the disc 103 interposed therebetween. An elastic element 104, similar to the elastic element described with reference to Fig. 1 is interposed between the driving and driven elements, the elastic element serving to seal the area of entry of the disc into the fluid cavity 106. The sections 107 and 108 of the driven element are machined identically at their periphery and are held in assembled relation by a retaining band 109. A fluid-tight seal is formed by a toroidal, elastic sealing ring 110 seated in a groove formed by two chamfers on the periphery of the driven member sections.

Although several embodiments of the invention are herein described, all have certain common characteristics, one of these being the utilization of an elastic element and a viscous fluid film for absorbing torsional vibration. The forms of the invention described with reference to Figs. 4 to 10 include the added feature provided by the self-adjusting driving member construction which maintains a viscous film of the desired dimension between the driving member and the adjacent faces of the driven inertia member.

The invention claimed is:

1. Torsional vibration damper assembly for mounting in operative relation to the crankshaft of a reciprocating engine comprising a driving member having a generally hollow cylindrical configuration and having a radially extending surface for concentric attachment to a crankshaft, a driven inertia member mounted concentrically of said driving member and having a central aperture therein accommodating said driving member, an elastic element interposed between said driving and driven members, said driven member being provided with a radially extending, annular cavity adapted to contain a viscous fluid, said driving member including a portion extending radially in fluid sealing relation with said elastic element and into said cavity, the relative disposition of said radially extending portion and said cavity being such as to maintain a fluid film between the adjacent faces thereof, whereby torsional vibrations of said crankshaft are absorbed both by said elastic element and by the resistance to shear of said fluid film, said elastic element being so selected as to have physical properties insuring the desired damper tuning and the desired division of work between the elastic element and said fluid film.

2. Torsional vibration damper assembly for mounting in operative relation to a shaft subject to torsional vibrations comprising a driving member having a generally hollow cylindrical configuration and having a radially extending surface for concentric attachment to the shaft, a driven inertia member mounted concentrically of said driving member and having a central aperture therein accommodating said driving member, an elastic element interposed between said driving and driven members, said driven member being provided with an annular cavity adapted to contain a viscous fluid, said driving member including a portion extending into said cavity, the relative disposition of said extending portion and said cavity being such as to maintain a fluid film between the adjacent faces thereof, whereby torsional vibrations of said shaft are absorbed both by said elastic element and by the resistance to shear of said fluid film.

3. Torsional vibration damper assembly for mounting in operative relation to a shaft subject to torsional vibration comprising a driving member having a generally hollow cylindrical configuration and having a radially extending surface for concentric attachment to said shaft, a driven inertia member having a central aperture therein accommodating said driving member and resiliently supported thereon, said driven member being provided with an annular cavity adapted to contain a viscous fluid, said driving member including a portion extending into said cavity, the relative disposition of said extending portion and said cavity being such as to maintain a fluid film between the adjacent faces thereof, whereby torsional vibrations of said shaft are absorbed by the resistance to shear of said fluid film.

4. A torsional vibration damper assembly for mounting in operative relation to a shaft subject to torsional vibration comprising a driving member having a generally hollow cylindrical configuration and having a radially extending surface for concentric attachment to the shaft, a driven inertia member mounted concentrically of said driving member and having a central aperture therein accommodating said driving member, an elastic element interposed between said driving and driven members, said elastic element comprising two elastic bands disposed in side-by-side relation, said driven member being provided with a radially extending, annular cavity adapted to contain a viscous fluid, said driving member including a portion extending radially between said elastic bands and into said cavity, the opposed inner margins of said bands providing a fluid seal at the area of entry of said radially extending portion into said cavity, resilient fingers carried within said cavity by said radially extending portion, said fingers being formed to extend in alternately opposite directions out of the plane of said radially extending portion thereby engaging the side faces of said cavity, a frictional facing carried by each of said fingers at its area of engagement with the cavity side faces, the resilience of said fingers tending to maintain a predetermined fluid film between said fingers and the adjacent cavity side faces independently of wear or erosion thereof, whereby torsional vibrations of said shaft are absorbed both by said elastic element and by the resistance to shear of said fluid film.

5. A torsional vibration damper assembly for mounting in operative relation to a shaft subject to torsional vibration comprising a driving member having a radially extending surface for concentric attachment to the shaft, a driven inertia member mounted concentrically of said driving member and having a central aperture therein accommodating said driving member, an elastic element interposed between said driving and driven members, said driven member being provided with an annular cavity adapted to contain a viscous fluid, said driving member including a portion extending into said cavity, resilient fingers carried within said cavity by said radially extending portion, said fingers being formed to extend in alternately opposite directions out of the plane of said radially extending portion thereby engaging the side faces of said cavity, the resilience of said fingers tending to maintain a predetermined fluid film between said fingers and the adjacent cavity side faces independently of wear or erosion thereof, whereby torsional vibrations of said shaft are absorbed both by said elastic element and by the resistance to shear of said fluid film.

6. A torsional vibration damper assembly for mounting in operative relation to a shaft subject to torsional vibration comprising a driving member having a generally hollow cylindrical configuration and having a radially extending surface for concentric attachment to said shaft, a driven inertia member having a central aperture therein accommodating said driving member and resiliently supported thereon, said driven member being provided with an annular cavity adapted to contain a viscous fluid, said driving member including a portion extending into said cavity, resilient fingers carried within said cavity by said radially extending portion, said fingers being formed to extend in alternately opposite directions out of the plane of said radially extending portion thereby engaging the side faces of said cavity, the resilience of said fingers tending to maintain a predetermined fluid film between said fingers and the adjacent cavity side faces independently of wear or erosion thereof, whereby torsional vibrations of said crankshaft are absorbed by the resistance to shear of said fluid film.

7. A torsional vibration damper assembly for mounting in operative relation to a shaft subject to torsional vibration comprising an anular driving member including an axially extending rim in concentric relation to the shaft, said rim having a concave peripheral surface, an annular driven inertia member mounted concentrically of said driving member and including an annular convex surface radially spaced from the concave surface of said driving member, an elastic element interposed between said driving and driven members, said elastic element comprising two elastic bands disposed in side-by-side relation, said driven member being provided with a radially extending, annular cavity adapted to contain a viscous fluid, said driving member including a portion extending radially between said elastic bands and into said cavity, the opposed inner margins of said bands providing a fluid seal at the area of entry of said radially extending portion into said cavity, resilient fingers carried within said cavity by said radially extending portion, said fingers being formed to extend in alternately opposite directions out of the plane of said radially extending portion thereby engaging the side faces of said cavity, the resilience of said fingers tending to maintain a predetermined fluid film between said fingers and the adjacent cavity side faces independently of wear or erosion thereof, whereby torsional vibrations of said shaft are absorbed both by said elastic element and by the resistance to shear of said fluid film.

8. A torsional vibration damper assembly for mounting in operative relation to a shaft subject to torsional vibration comprising an annular driving member including an axially extending rim in concentric relation to the shaft, said rim being formed by two frusto conical sections joined at their apexes, an annular driven inertia member mounted concentrically of said driving member and including an annular surface conforming to the surface of said driving member rim and spaced from the rim surface, an elastic element interposed between said driving and driven members, said elastic element comprising two elastic bands disposed in side-by-side relation, said driven member being provided with a radially extending annular cavity adapted to contain a viscous fluid, said driving member including a portion extending radially between said elastic bands and into said cavity, the opposed inner margins of said bands providing a fluid seal at the area of entry of said radially extending portion into said cavity, resilient fingers carried within said cavity by said radially extending portion, said fingers being formed to extend in alternately opposite directions out of the plane of said radially extending portion thereby engaging the side faces of said cavity, the resilience of said fingers tending to maintain a predetermined fluid film between said fingers and the adjacent cavity side faces independently of wear or erosion thereof, whereby torsional vibrations of said shaft are absorbed both by said elastic element and by the resistance to shear of said fluid film.

9. A torsional vibration damper assembly for mounting in operative relation to a shaft subject to torsional vibration comprising a driving member having a generally hollow cylindrical configuration and having a radially extending surface for concentric attachment to the shaft, an annular driven inertia member mounted concentrically of said driving member and having a central aperture therein accommodating said driving member, an elastic element interposed between said driving and driven members, said driven member having a circular depression in one axial face and provided with an end plate overlying said depression to thereby provide an annular cavity adapted to contain a viscous fluid, a sealing ring supported by said end plate adjacent said elastic element, said driving member including a portion extending radially between said elastic element and said sealing ring into said cavity, said elastic element and said sealing ring providing a fluid seal at the area of entry of said radially extending portion into said cavity, resilient fingers carried within said cavity by said radially extending portion, said fingers being formed to extend in alternately opposite directions out of the plane of said radially extending portion thereby engaging the side faces of said cavity, the resilience of said fingers tending to maintain a predetermined fluid film between said fingers and the adjacent cavity side faces independently of wear or erosion thereof whereby torsional vibrations of said shaft are absorbed both by said elastic element and by the resistance to shear of said fluid film.

10. Torsional vibration damper assembly for mounting in operative relation to a shaft subject to torsional vibration comprising a driving member having a hollow cylindrical configuration and having a radially extending surface for concentric attachment to the shaft, a driven inertia member mounted concentrically of said driving member and having a central aperture therein accommodating said driving member, an elastic element interposed between said driving and driven members, said driven member being provided with a radially extending, annular cavity adapted to contain a viscous fluid, said driving member including a portion extending radially in fluid sealing relation with said elastic element and into said cavity, the relative disposition of said radially extending portion and said cavity being such as to maintain a fluid film between the adjacent faces thereof, whereby torsional vibrations of said shaft are absorbed both by said elastic element and by the resistance to shear of said fluid film, and heat dissipating means including surfaces extending from said driven member for removing heat from said driving and driven members and from said fluid film.

11. A torsional vibration damper assembly for mounting in operative relation to a shaft subject to torsional vibration comprising a driven member having a generally hollow cylindrical configuration and having a radially extending surface for concentric attachment to the shaft, a driven inertia member mounted concentrically of said driving member and having a central aperture therein accommodating said driving member, an elastic element interposed between said driving and driven members, said driven member being provided with an annular cavity adapted to contain a viscous fluid, said driving member including a portion extending into said cavity, resilient fingers carried within said cavity by said radially extending portion, said fingers being formed to extend in alternately opposite directions out of the plane of said radially extending portion thereby engaging the side faces of said cavity, the resilience of said fingers tending to maintain a predetermined fluid film between said fingers and the adjacent cavity side faces independently of wear or erosion thereof, whereby torsional vibrations of said shaft are absorbed both by said elastic element and by the resistance to shear of said fluid film, and heat dissipating means including surfaces extending from said driven member for removing heat generated in said damper assembly.

12. A torsional vibration damper assembly of the type claimed in claim 11 wherein said driven member comprises two annular elements having opposed undercut areas providing said cavity, an annular sealing member disposed between said elements adjacent their periphery, and means clamping said elements in sealed relation.

13. A torsional vibration damper assembly of the type claimed in claim 11 wherein said driven member comprises two annular elements having opposed undercut areas providing said cavity, one of said elements having a peripheral groove therein adapted to receive a sealant material, the other of said elements having a portion overlying said groove and the peripheral margin of said one element, whereby deforming said portion into gripping relation with said one element places said sealant material under pressure and retains said elements in assembled relation.

14. A torsional vibration damper assembly of the type claimed in claim 11, wherein said driven member comprises two annular elements having opposed undercut areas providing said cavity, one of said elements having a peripheral groove and a communicating annular pocket formed therein, the other of said elements having an axially extending flange overlapping the periphery of said one element and provided with an annular groove adjacent the groove in said one element, said annular pocket being adapted to receive a sealant material and the space bounded by the grooves in said elements accommodating a ductile wire ring deformed therein to retain said elements in assembled relation and to place said sealant material under pressure.

15. A torsional vibration damper assembly of the type claimed in claim 11, wherein said driven member comprises two annular elements having opposed undercut areas providing said cavity, one of said elements having a peripheral groove therein, the other of said elements having an axially extending flange overlapping the periphery of said one element and having an annular groove formed therein disposed opposite the groove in said one element, the spaced bounded by said grooves being adapted to receive a sealant material and a ductile wire ring deformable to place the sealant material under pressure and to retain said elements in assembled relation.

16. A torsional vibration damper assembly of the type claimed in claim 11 wherein said driven member comprises two annular elements having opposed undercut areas providing said cavity, one of said elements having a peripheral groove therein adapted to accommodate a toroidal sealing ring of elastic material, the other of said elements having an axially extending flange overlapping the periphery of said one element and exerting a sealing pressure on said sealing ring, and means for retaining said elements in assembled relation comprising opposed annular grooves formed in said elements and a retaining ring deformed into said opposed grooves.

17. A torsional vibration damper assembly of the type claimed in claim 11 wherein said driven member comprises two annular elements having opposed undercut areas providing said cavity, the contiguous peripheral margins of said elements having mating chamfers therein, the annular space bounded by chamfers receiving a sealing material, and means for retaining said elements in assembled relation comprising a clamping element encircling the adjacent peripheral margins of said elements and overlying said sealing material.

References Cited in the file of this patent

UNITED STATES PATENTS

| | | |
|---|---|---|
| 1,230,205 | Nichols | June 19, 1917 |
| 2,473,335 | Hardy | June 14, 1949 |
| 2,585,382 | Guernsey | Feb. 12, 1952 |
| 2,636,399 | O'Connor | Apr. 28, 1953 |
| 2,882,747 | Haushalter | Apr. 21, 1959 |

FOREIGN PATENTS

| | | |
|---|---|---|
| 305,527 | Great Britain | Nov. 21, 1929 |
| 514,854 | Germany | Dec. 18, 1930 |
| 876,921 | France | Aug. 24, 1942 |